Figure 1:
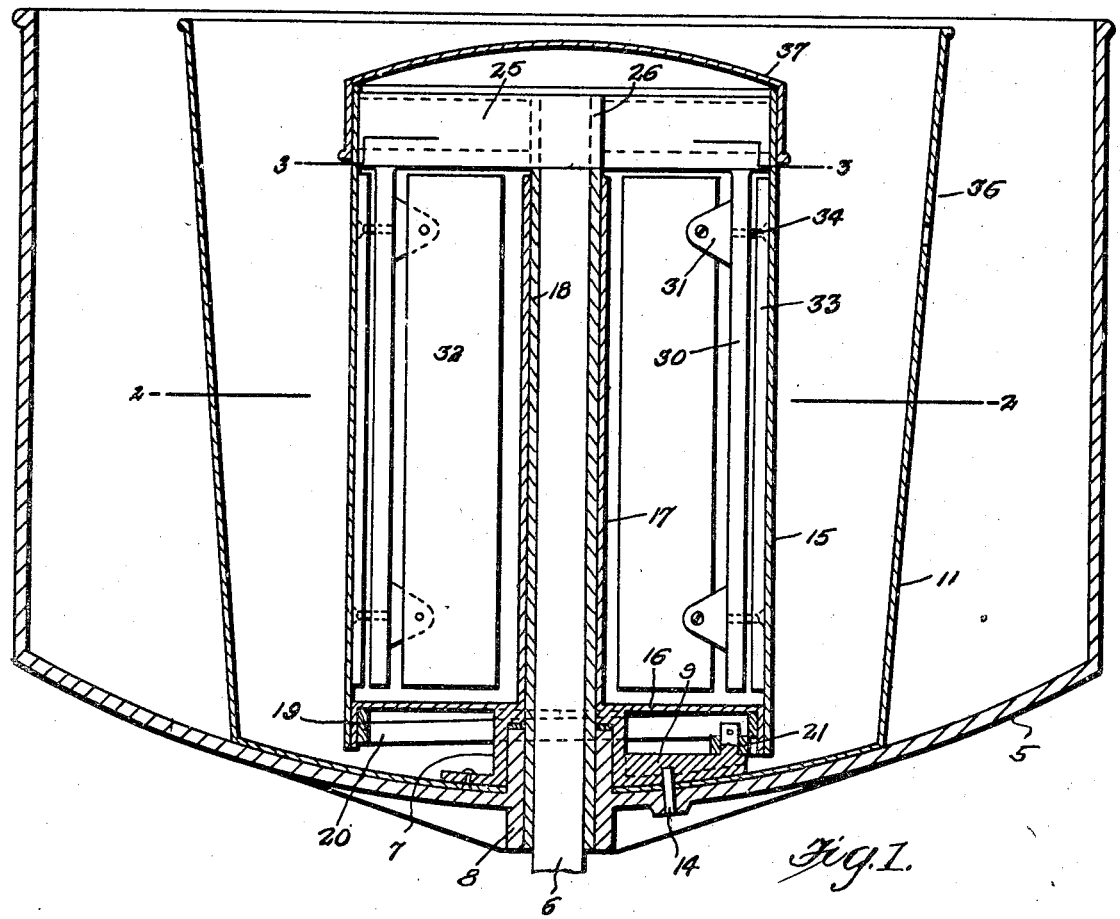

Jan. 1, 1929.

L. F. KRACKE 1,697,656

CHURN AND ICE CREAM FREEZER ATTACHMENT

Filed Nov. 14, 1927    2 Sheets-Sheet 1

Inventor
L.F.Kracke,

By Clarence A.O'Brien
Attorney

Jan. 1, 1929.
L. F. KRACKE
1,697,656
CHURN AND ICE CREAM FREEZER ATTACHMENT
Filed Nov. 14, 1927   2 Sheets-Sheet 2
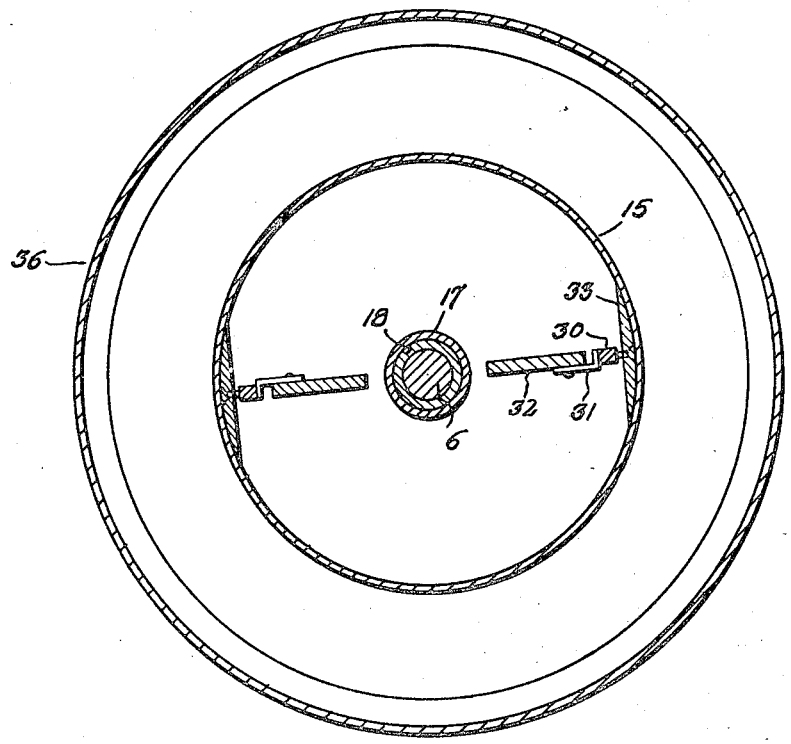
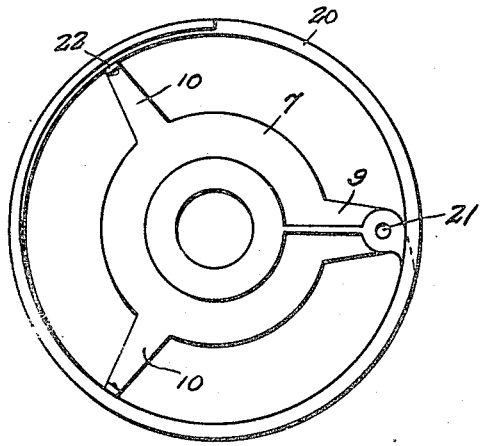
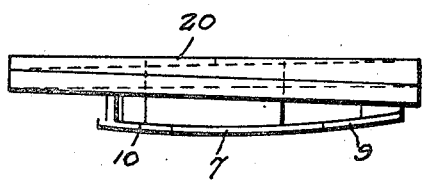
Inventor
L.F.Kracke,
By Clarence A.O'Brien
Attorney Patented Jan. 1, 1929.

1,697,656

UNITED STATES PATENT OFFICE.

LEE F. KRACKE, OF WILBER, NEBRASKA.

CHURN AND ICE-CREAM-FREEZER ATTACHMENT.

Application filed November 14, 1927. Serial No. 233,154.

The present invention aims to provide an attachment on certain forms of domestic power washing machines enabling it to be of two other uses, namely, for churning and for making ice cream. The attachment is applicable chiefly to such machines having a central oscillating shaft which is disposed in a vertical position.

An important object of the invention resides in the provision of an attachment of this nature which enables the advantages of three complete power machines to be economically combined into an investment of a little more than one.

Another very important object of the invention resides in the provision of the combination of the necessary elements of an ice cream freezer or a churn or both with the driving mechanism of a power domestic washing machine.

A still further object of the invention resides in the provision of an attachment of this nature which is comparatively simple in its construction, strong and durable, inexpensive to manufacture, easy to install, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 3:
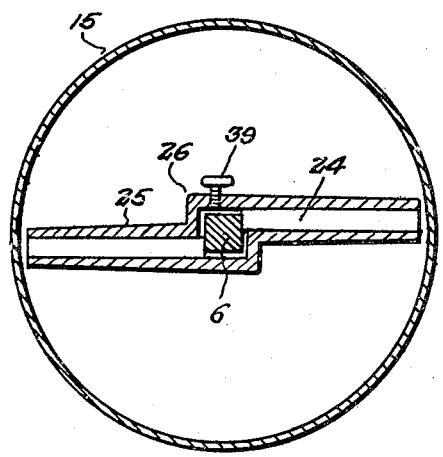
Figure 4:
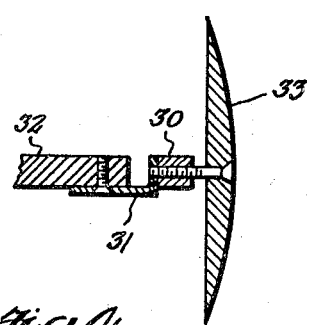

Figure 1 is a vertical section through the attachment showing the same disposed in the vessel of the washing machine, Figure 2 is a transverse section therethrough taken substantially on the line 2—2 of Figure 1, Figure 3 is a transverse section taken substantially on the line 3—3 of Figure 1, Figure 4 is an enlarged detail transverse section through one of the paddle units, Figure 5 is a plan view of the collar and brake member, Figure 6 is an elevation of the structure shown in Figure 5.

Referring to the drawing in detail it will be seen that the numeral 5 denotes the washing machine vessel and the numeral 6 the usual vertical oscillating shaft. The paddle or agitating structure on the shaft 6 is removed before this attachment is put in place. The numeral 7 denotes a collar disposed about the inner hub portion 8 of the vessel 5 and has a plurality of spokes 9 and 10—10 radiating outwardly therefrom. A container 11 has its bottom formed with an opening through which the inner portion of the hub 8 extends. The spoke 9 is fixed to the bottom of the container 11 and the bottom of the vessel 5 by means of a pin 14 or in any other suitable manner. The numeral 15 denotes a cylindrical casing with a bottom 16 having a tube 17 rising therefrom coaxially with the casing 15 and disposed about a sleeve 18 on the oscillating shaft 6. The bottom 16 and the casing 15 are formed with an annular flange structure 19 at their bottom concentrically disposed about the collar 7. A coil member 20 of spring material consisting of more than one convolution and less than two convolutions has one end anchored as at 21 to the spoke 9 and the spokes 10 have projections 22 so as to hold the coil in close proximity to the flange 19. When the casing 15 rotates in one direction it will be seen that this will tend to contract the coils so that the same will offer little or no resistance but when the casing tends to rotate in the opposite direction, that is in a counter clockwise direction considering Figures 2 and 5, this tends to expand the coil member so that the same will function as a brake to retard such motion in the casing 15.

Dogs 24 extend inwardly from the top portion of the casing 15 and terminate adjacent the center thereof in offset relation in relatively close proximity to the upper end of the shaft 6 which is square as is indicated to advantage in Figure 3. The numeral 25 denotes a part of the main body of the inside of the oscillating member to which vanes and rods 30 are attached. The dogs 24 slide loosely in this body. The square part of the vertical shaft supports the main body 25 although fitting very loosely thereon. This body 25 is in one piece hollowed or cored. The action is as follows. When the driving shaft is turning to the right its relative position shown by full lines, forcing the dogs 24 out against the smooth rim of the casing and turning it by frictional force. The opposite rotation shown by dotted lines causes the body 25 to again turn with the shaft but releases the outward pressure of the dogs 24 and their connection with the casing. To use the machine as a churn, the set screw 39 is turned against the shaft thus preventing the above described clutch action and the casing 15 does not turn.

Rods 30 depend from the body 25 and have brackets 31 thereon supporting paddles 32. Plates 33 are engaged on the rods 30 by means of screws 34 or in a similar manner and have their outer faces arcuate as is clearly shown in Figure 4 to engage the inner surface of the casing 15.

An overflow opening 36 is provided in the container 11 adjacent the upper edge thereof. A cover 37 is provided for the casing 15 and tends to strength the upper end of the casing 15 to withstand the stress of the plates 25.

As stated above, the usual washing agitator is removed from the shaft 6. For making ice cream, the container 11 is secured in position. The can or casing 15 is placed inside and filled to not exceeding a certain height. The ice and salt will be packed in the usual manner and the power turned on to oscillate the shaft 6. The shaft will oscillate and the clutch like mechanism formed by the plates 25 and the lower brake mechanism formed by the coils 20 will operate so that when the can is driven one way the brake is released in that direction and when the drive shaft reverses the clutch is released and the brake functions. The result is the turning of the can or casing 15 in the first given direction while it is held stationary when the shaft rotates in the opposite direction. To churn the container 11 may be omitted if desired, and the set screw 39 tightened against shaft (holding clutch in release) so as to provide a stationary can and an oscillating motion of the paddles 32. Backlash may be regulated and controlled by means of a set screw 39.

It is thought that the construction, operation, and advantages of the invention will now be clearly understood without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new:—

1. In a combined ice cream freezer and washing machine having a vertical driving shaft, a cream container, means for engaging and releasing the cream container to and from the driving shaft, a brake mechanism, means for releasing and applying the brake mechanism in respect to said container.

2. In a combined ice cream freezer and washing machine having a vertical driving shaft, a cream container, means for engaging and releasing the cream container to and from the driving shaft, a brake mechanism, means for releasing and applying the brake mechanism in respect to said container, and means for rendering both actions automatically and properly timed so that the oscillating shaft imparts a relatively intermittent rotating motion between the container and an inside member and the container and an outside ice pack.

3. In a combined ice cream freezer and washing machine having a vertical driving shaft, a cream container, means for engaging and releasing the cream container to and from the driving shaft, a brake mechanism, means for releasing and applying the brake mechanism in respect to said container, and means for rendering both actions automatically and properly timed so that the oscillating shaft imparts a relatively intermittent rotation motion between the container and an inside member and the container and an outside ice pack, and means for rendering the engaging mechanism of the drive shaft ineffective so that the inside member only may turn.

4. In combination, an oscillating shaft, a container on the oscillating shaft, agitating means in the container, means between the container and the shaft for rotating the container in one direction with the shaft only, and means tending to brake the container against rotation in the other direction.

5. In combination, an oscillating shaft, a container rotatably mounted on the oscillating shaft, agitating means in the container, means between the container and the shaft for rotating the container in one direction only with the shaft, said container having an annular flange, a coil member in the flange, means for anchoring one end of the coil member so that said coil member will prevent the rotation of the container in the other direction.

In testimony whereof I affix my signature.

LEE F. KRACKE.